(12) United States Patent
Karidis et al.

(10) Patent No.: US 7,518,822 B1
(45) Date of Patent: Apr. 14, 2009

(54) DATA STORAGE CARTRIDGE GRIPPER WITH DEEP-REACH

(75) Inventors: John P. Karidis, Ossining, NY (US); Mark D. Schultz, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 11/374,190

(22) Filed: Mar. 13, 2006

(51) Int. Cl.
*G11B 15/68* (2006.01)

(52) U.S. Cl. ..................................... 360/92.1

(58) Field of Classification Search ........................ None
See application file for complete search history.

(56) References Cited

U.S. PATENT DOCUMENTS

| 5,089,920 | A | | 2/1992 | Bryer et al. |
|---|---|---|---|---|
| 5,157,565 | A | | 10/1992 | Domel |
| 5,184,260 | A | * | 2/1993 | Pierrat ........................ 360/92.1 |
| 5,247,406 | A | | 9/1993 | Apple et al. |
| 5,421,697 | A | * | 6/1995 | Ostwald ................... 414/753.1 |
| 6,153,999 | A | | 11/2000 | Borrego |
| 6,560,061 | B2 | * | 5/2003 | Helmick et al. ............. 360/92.1 |
| 6,781,789 | B2 | * | 8/2004 | Ostwald ..................... 360/92.1 |
| 2002/0027742 | A1 | | 3/2002 | Ostwald et al. |
| 2003/0063411 | A1 | * | 4/2003 | Ostwald ...................... 360/92 |
| 2003/0063527 | A1 | | 4/2003 | Ostwald |

* cited by examiner

*Primary Examiner*—Mark Blouin
(74) *Attorney, Agent, or Firm*—Dan Shifrin (57) ABSTRACT

In an automated library, data cartridges, such as magnetic tape cartridges, are stored in multi-cartridge storage cells or shelves and accessed by data storage drives. An accessor with a deep-reach gripper transports cartridges between storage cells and storage drives. The gripper is capable of extending into the cell to grip and remove a cartridge stored in any position therein. The gripper may include a scissors mechanism, a set of units extendable with lead screws, or another extendable mechanism.

19 Claims, 12 Drawing Sheets

DATA STORAGE CARTRIDGE GRIPPER WITH DEEP-REACH

RELATED APPLICATION DATA

The present application is related to commonly-assigned and co-pending U.S. application Ser. No. 11/374,504, entitled MANAGEMENT OF DATA CARTRIDGES IN MULTIPLE-CARTRIDGE CELLS IN AN AUTOMATED DATA STORAGE LIBRARY, and Ser. No. 11/373,963, entitled CARTRIDGE RETENTION IN AN AUTOMATED DATA STORAGE LIBRARY, both filed on the filing date hereof, which applications are incorporated herein by reference in their entireties.

TECHNICAL FIELD

The present invention relates generally to automated data storage libraries and, in particular, to increasing the storage density of data cartridges within cartridge storage cells.

BACKGROUND ART

Automated data storage libraries are known for providing cost effective storage and retrieval of large quantities of data. The data in automated data storage libraries is stored on data storage media that are, in turn, stored on storage cells, shelves or the like inside the library in a fashion that renders the media, and its resident data, accessible for physical retrieval. Such media is commonly termed "removable media". Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media. Typically, the data stored in automated data storage libraries is resident on data storage media that is contained within a data storage cartridge, also referred to herein as a cartridge. An example of a data storage cartridge that is widely employed in automated data storage libraries for mass data storage is a magnetic tape cartridge.

In addition to data storage media, automated data storage libraries typically contain one or more data storage drives that store (write) data to and/or retrieve (read) data from the data storage media. Transport of cartridges between storage cells and storage drives is typically accomplished by one or more robotic accessors. Such accessors have grippers for physically retrieving a selected cartridge from a storage cell within the automated data storage library and transporting the cartridge to a storage drive by moving in the horizontal and/or vertical directions.

Customer demands for storage have increased. One method for satisfying such demands has been the development of increased storage media density, along with new data drives, such that more data can be stored in the same amount of customer floor space. While increased media density has helped alleviate the forgoing demand, the need for increased storage has continued. While storage cells have traditionally been designed to hold a single data cartridge, a more recent development has been storage cells designed to be deep enough to hold two or even more data cartridges. Thus, with only an incremental increase in the library footprint, the data density of a library may be increased by a factor of two or more.

When a cell is only deep enough for a single cartridge, the cartridge is always within reach of the accessor gripper. However, when a cell holds more than one cartridge and the front cartridge has been removed, it is necessary for the remaining cartridges to be moved forward to be reachable by a conventional gripper. This can be accomplished by the use of a spring located in the rear of the cell which pushes the cartridges forward. Alternatively, the cells may be angled downward at the front so that gravity will cause the cartridges to slide forward (a spring may be used also to assist gravity). Other techniques have also been proposed. However, such techniques may leave cartridges "hung up" in a cell, be unreliable, complicated or expensive.

Consequently, a need remains for a reliable mechanism to remove all cartridges from a multi-cartridge cell which does not add significantly to the cost or complexity of an automated data storage library.

SUMMARY OF THE INVENTION

The present invention provides an automated library, a deep-reach gripper and methods for removing data cartridges, such as magnetic tape cartridges, from multi-cartridge storage cells. An accessor with a deep-reach gripper transports cartridges between storage cells and storage drives. The gripper is capable of extending into the cell to grip and remove a cartridge stored in any position therein. The gripper may include a scissors mechanism, a set of units extendable with lead screws, or another extendable mechanism.

DETAILED DESCRIPTION OF THE PREFERRED EMBODIMENT

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in an automated magnetic tape library storage system for use in a data processing environment. Although the invention shown uses magnetic tape cartridges, one skilled in the art will recognize the invention equally applies to optical disk cartridges or other removable storage media and the use of different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
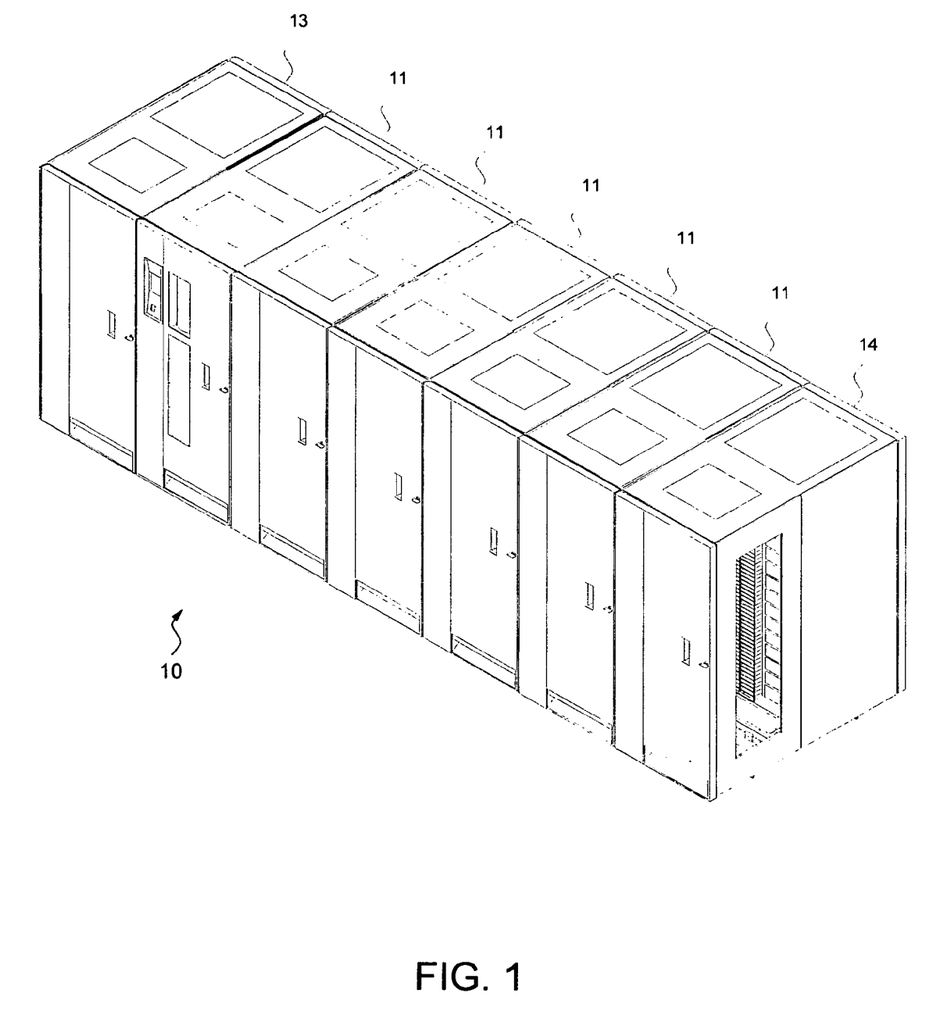
FIG. 1 is an isometric view of an automated data storage library adaptable to implement an embodiment of the present invention, with the view specifically depicting a library having a left hand service bay, multiple storage frames and a right hand service bay.
Figure 2:
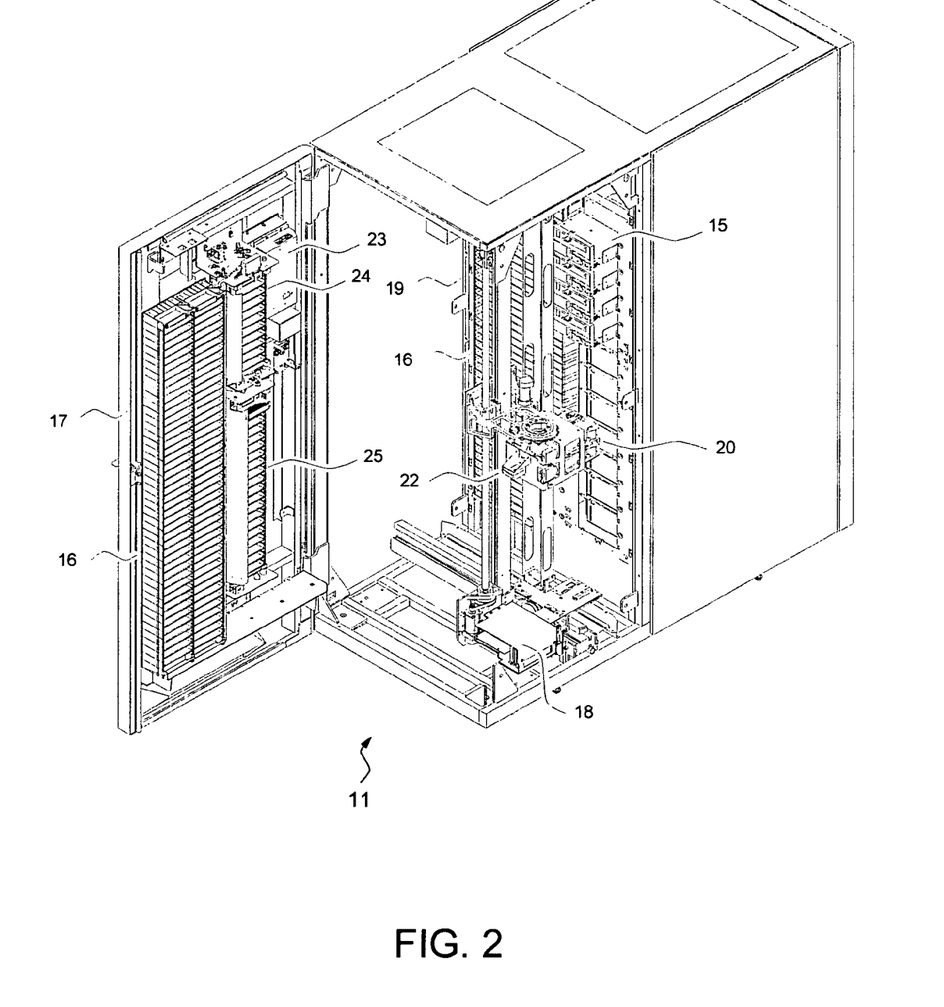
FIG. 2 is an isometric view of an automated data storage library adaptable to implement an embodiment of the present invention, with the view specifically depicting an exemplary basic configuration of the internal components of a library.

Turning now to the Figures, FIGS. 1 and 2 illustrate an automated data storage library 10 with a housing in which data storage cartridges containing data storage media (not shown) are stored in and retrieved from storage cells or shelves 16. It is noted that references to "data storage media" herein also refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library. The library of FIG. 1 comprises a left hand service bay 13, one or more storage frames 11A-11E (referred to herein generically as storage frame 11), and right hand service bay 14. As will be discussed, a frame may comprise an expansion component of the library. Frames may be added or removed to expand or reduce the size and/or functionality of the library. Frames may comprise additional storage cells, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage cells 16, on front wall 17 and rear wall 19 for storing data cartridges that contain data storage media; at least one data storage drive 15 for reading and/or writing data from/to the data storage media; and a first accessor 18 for transporting the data storage media between the plurality of storage cells 16 and the data storage drive(s) 15. The data storage drives 15 may be optical disk drives or magnetic tape drives, or other types of data storage drives as are used to read and/or write data from/to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage cartridges to be inserted into the library and/or removed from the library without disrupting library operation. The library 10 may comprise one or more storage frames 11, each having storage cells 16 accessible by first accessor 18.

As described above, the storage frames 11 may be configured with different components depending upon the intended function. One configuration of storage frame 11 may comprise storage cells 16, data storage drive(s) 15, and other optional components to store and retrieve data from the data storage cartridges. The first accessor 18 comprises a base assembly, a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
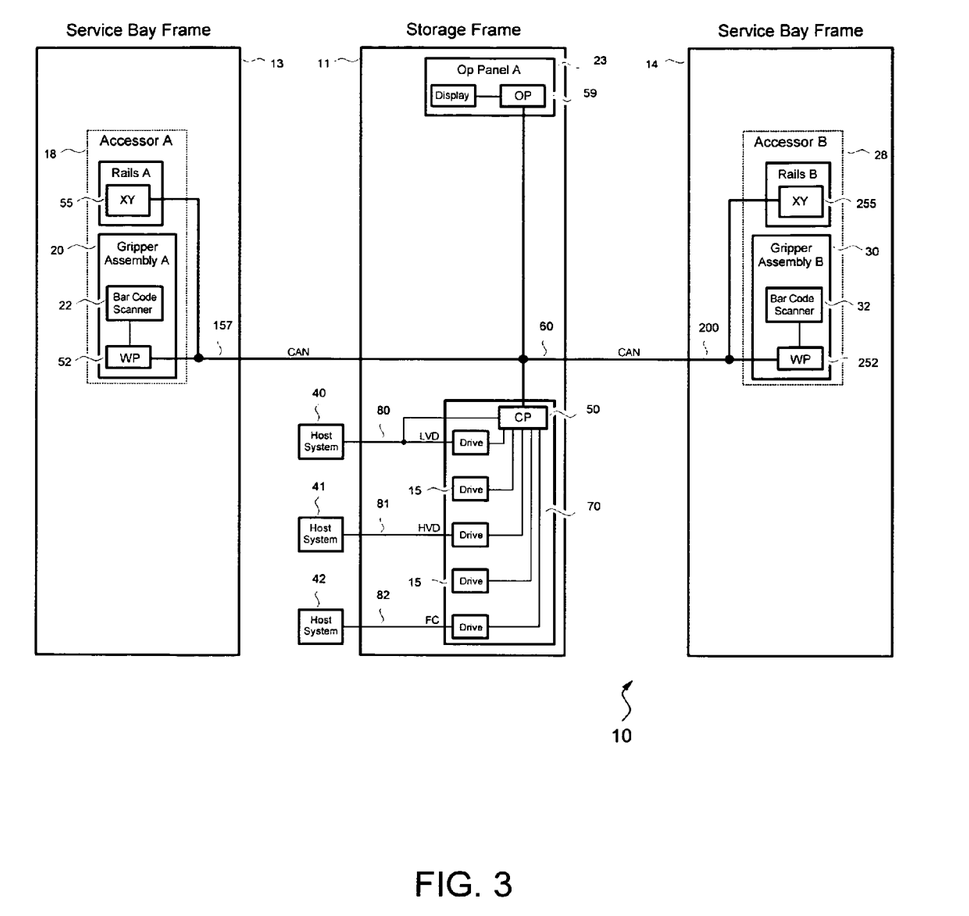
FIG. 3 is a block diagram of an automated data storage library adaptable to implement an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which may implement the present invention, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," which is incorporated herein by reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may share a common horizontal rail and have independent vertical rails. The first accessor 18 and the second accessor 28 are described as first and second for descriptive purposes only and this description is not meant to limit either accessor to an association with either the left hand service bay 13, or the right hand service bay 14.

In the library 10 illustrated as an example in FIG. 3, first accessor 18 and second accessor 28 move their grippers in at least two directions, called the horizontal "X" direction and vertical "Y" direction, to retrieve and grip, or to deliver and release the cartridges at the storage cells 16 and to load and unload the cartridges at the data storage drives 15.

The library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage cells 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The library 10 is controlled by a distributed control system receiving the logical commands from hosts, determining the required actions, and converting the actions to physical movements of first accessor 18 and/or second accessor 28.

In the library 10, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives 15 and with host systems 40, 41 and 42. Alternatively, the host systems 40, 41 and 42 may be directly coupled to the communication processor node 50, at input 80 for example, or to control port devices (not shown) which connect the library 10 to the host system(s) with a library interface similar to the drive/library interface. As is known to those of skill in the art, various communication arrangements may be employed for communication with the hosts 40, 41 and 42 and with the data storage drives 15. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage cartridges, and an XY processor node 255 may be provided and may be located at an XY system of the second accessor 28. The second accessor 28 may run on the same horizontal mechanical path as first accessor 18 or on an adjacent path. The control system additionally may also comprise an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, the network 157 may not be associated with the left hand service bay 13 and the network 200 may not be associated with the right hand service bay 14. Depending on the design of the library and the particular needs of the customer, it may not be necessary to have a left hand service bay 13 and/or a right hand service bay 14.

Figure 4:
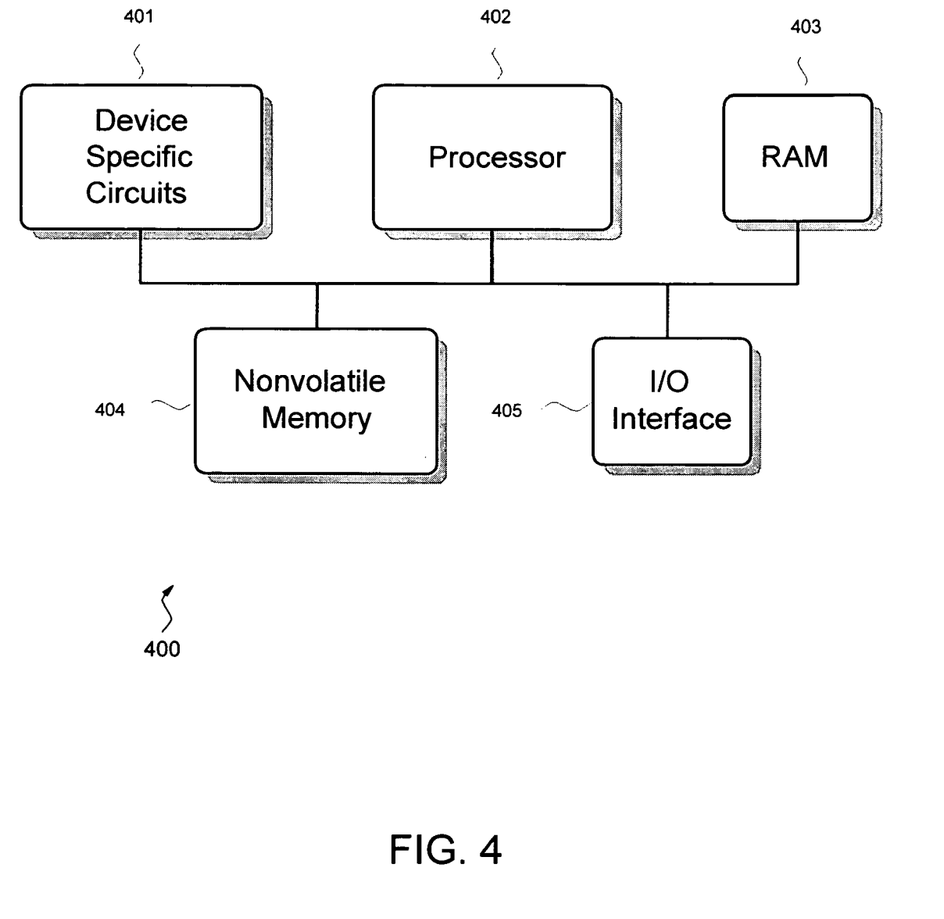
FIG. 4 is a block diagram depicting an exemplary controller configuration.

An automated data storage library 10 typically comprises one or more controllers to direct the operation of the automated data storage library. Host computers and data storage drives typically comprise similar controllers. A controller may take many different forms and may comprise, for example but not be limited to, an embedded system, a distributed control system, a personal computer, or a workstation, etc. Alternatively, one of the processor nodes 50, 52, 55, 59, 252, 255 may comprise a controller. In such a configuration, one of the processor nodes comprises the controller while any other processor nodes may work under the direction of the controller. Still further, two or more of the processor nodes 50, 52, 55, 59, 252, 255 may comprise a controller. In this further configuration, two or more processor nodes comprise the controller while any other processor nodes may work under the direction of the controller. Essentially, the term "controller" as used herein is intended in its broadest sense as a device or system that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus), Fibre Channel, SCSI (Small Computer Systems Interface), etc. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

Figure 5A:
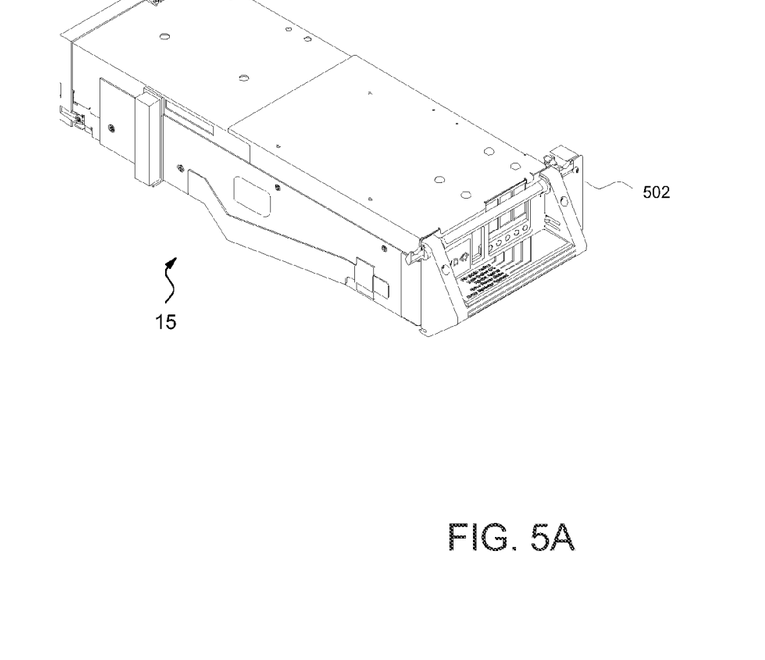
FIGS. 5A and 5B show front and rear isometric views, respectively, of a data storage drive adaptable to implement an embodiment of the present invention.
Figure 5B:
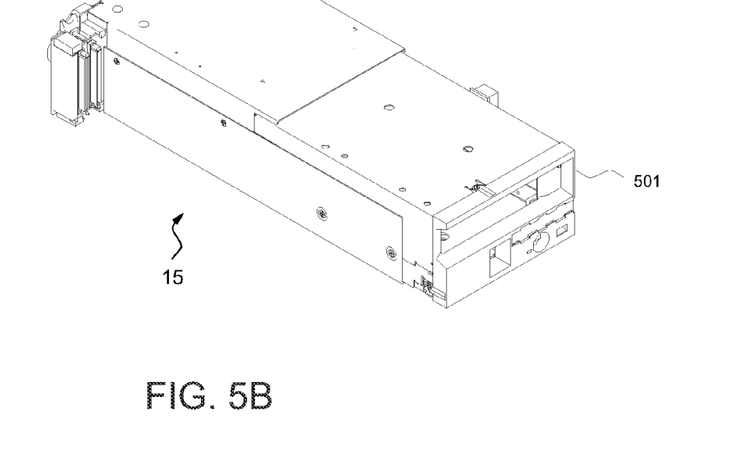

FIGS. 5A and 5B illustrate the front 501 and rear 502, respectively, of a data storage drive 15. In the example of FIGS. 5A, 5B, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
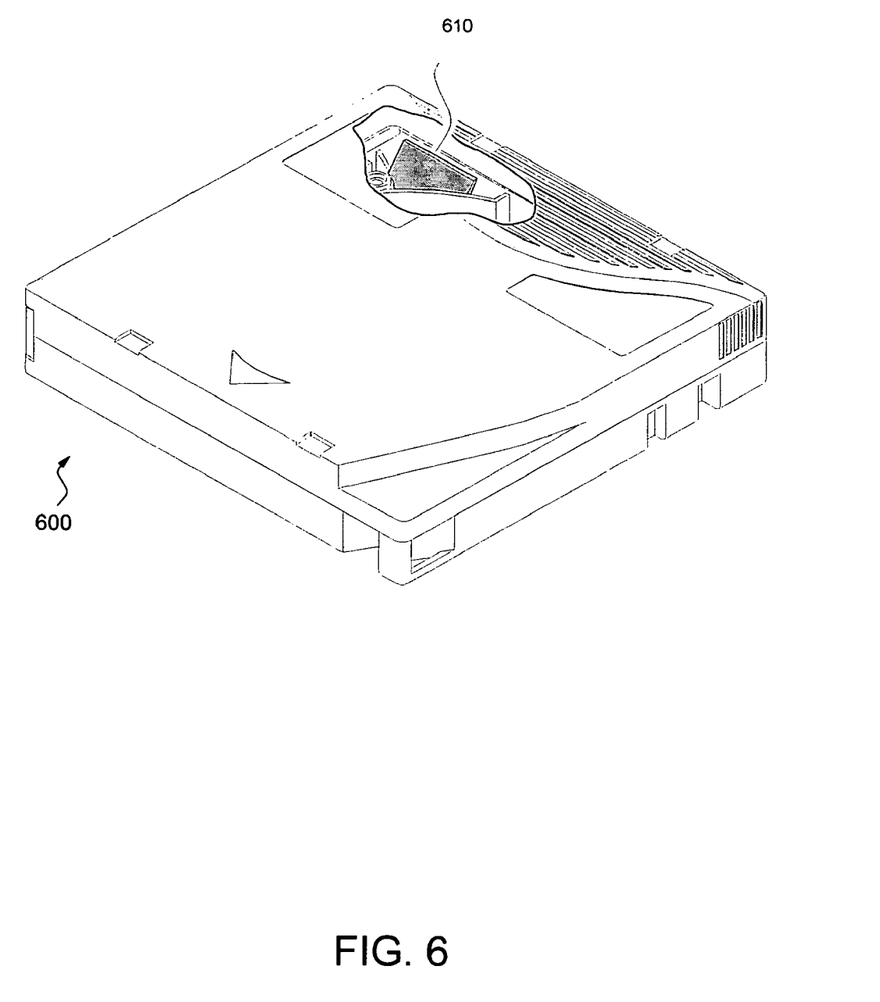
FIG. 6 is an isometric view of a data storage cartridge adaptable to implement an embodiment of the present invention with a portion cut-away to show a cartridge memory.

FIG. 6 illustrates an embodiment of a data storage cartridge 600 with a cartridge memory 610 shown in a cutaway portion of the Figure. Information may be written to as well as read from the cartridge memory 610. Such information may include, but is not limited to, a cartridge identifier, the cartridge type and the media type. During normal operations, a cartridge memory reader 21 (FIG. 2), which may be located on the accessor or gripper, is able to read the contents of the cartridge memory 610 when it is in close proximity thereto and can thereby confirm, for example, that the cartridge is the correct one to grip and transport to a storage drive. The cartridge memory may also be used as part of an inventory update when the cartridge is inserted into the library. The cartridge 600 also includes notches 620 which have been engaged by a detent finger in prior art libraries to retain the cartridge within a storage cell.

Figure 7:
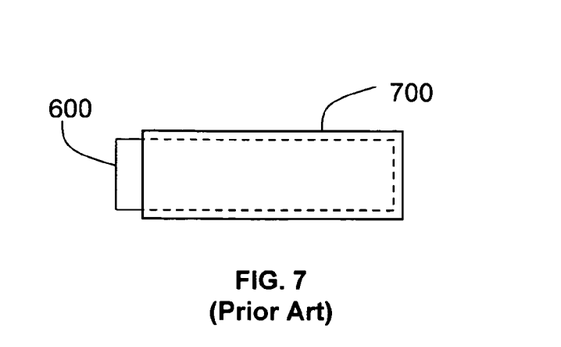
FIG. 7 illustrates a prior art single-cartridge storage cell.
Figure 8:
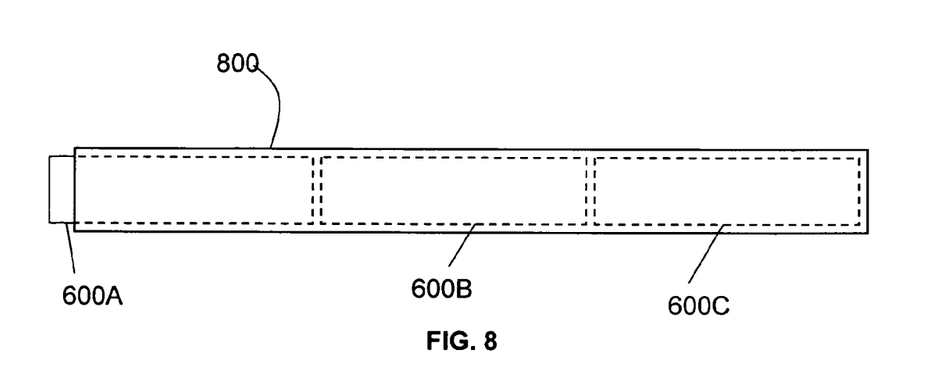
FIG. 8 illustrates a multiple-cartridge storage cell with which the present invention may be implemented.
Figure 9:
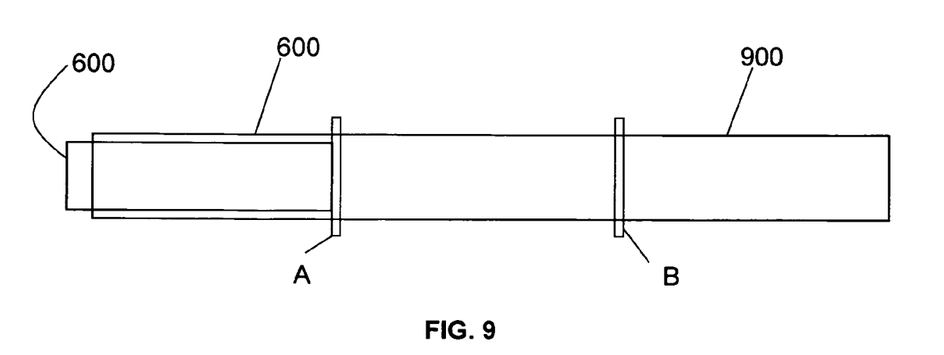
FIG. 9 illustrates a variable-depth storage cell of the present invention.

FIG. 7 illustrates a conventional storage cell 700 having a depth, from the front opening (on the left in the figure) to the back end, sufficient to hold a single data storage cartridge 600. The storage cell 800 in FIG. 8 has sufficient depth to hold multiple data storage cartridges 600A, 600B, 600C. Although the cell 800 in FIG. 8 can store three cartridges, the present invention may be adapted for use with cells storing any reasonable number of cartridges. Moreover, the present invention provides an adjustable-depth storage cell, as illustrated in FIG. 9. The illustrated cell 900 is capable of storing up to three cartridges. However, some customers may want the flexibility to start with a single-cartridge cell with a conventional accessor gripper and later upgrade to a multi-cartridge cell with a deep-reach gripper of the present invention. A pin 910 may be inserted through two opposite walls, such as the top and bottom walls as illustrated, in either of two positions, A; B. When the pin 910 is inserted in the first position A, only one cartridge 600 may be stored in the cell 900. When the pin 910 is inserted in the second position B, two cartridges may be stored. And, when the pin is removed, three cartridges may be stored. In addition, the same cell 900 may include throughholes at positions appropriate for cartridges of different lengths, such as LTO or IBM® 3592.

Figure 10A:
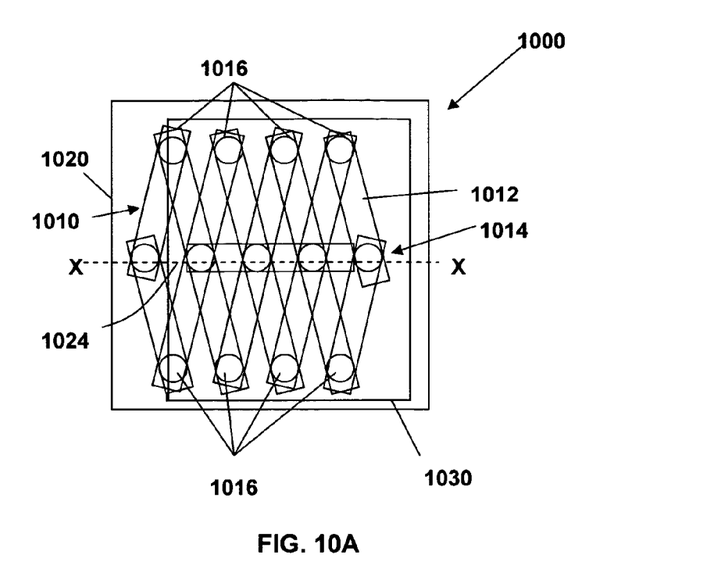
FIGS. 10A through 10E illustrate an embodiment of a deep-reach cartridge gripper of the present invention, in the retracted and extended states, respectively, illustrating alternative drive mechanisms.
Figure 10B:
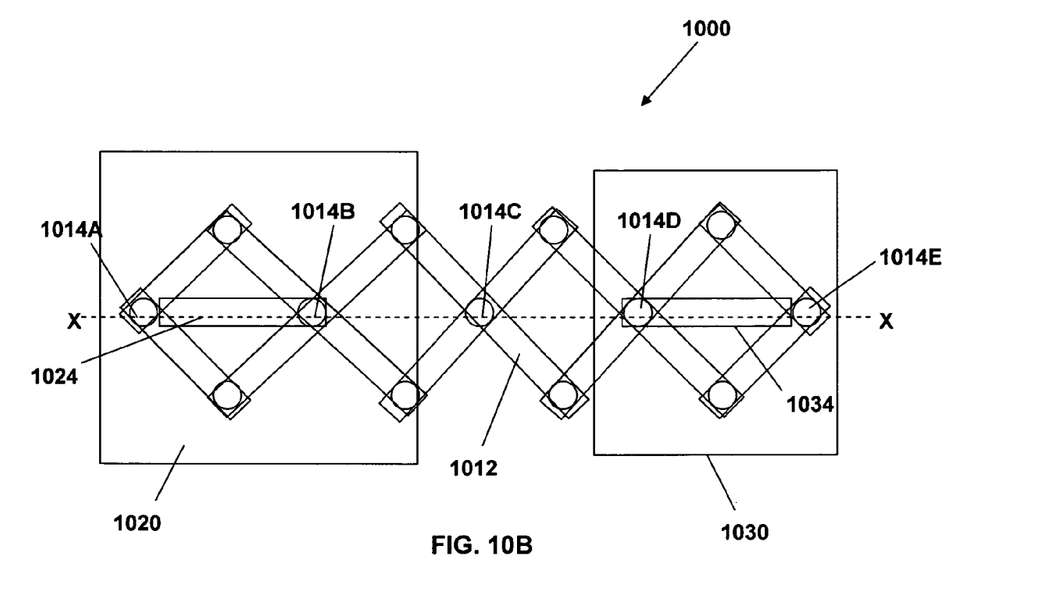

In order to reach cartridges stored at all positions of the multi-cartridge cell 800, the present invention provides a deep-reach gripper which is extendable into a storage cell. FIGS. 10A and 10B are top views which illustrate one embodiment of such a deep-reach cartridge gripper mechanism 1000, in the retracted and extended states, respectively. The gripper mechanism 1000 includes a scissors mechanism 1010 having cross-braces 1012, center hinge pins 1014 connecting the cross-braces 1012 and spaced along a longitudinal center line X-X, and pairs of side hinge pins 1016, also connecting the cross-braces 1012 and positioned at opposite ends of lines perpendicular to the longitudinal center line X-X, approximately halfway between adjacent center hinge pins. The gripper mechanism 1000 also includes a base unit 1020. The base unit 1020 has a slot 1024 formed therein along a portion of the center line X-X. The gripper mechanism 1000 further includes a gripper assembly 1030 functionally comparable to the gripper assembly 20 (FIG. 2), also with a slot 1034 formed therein along a portion of the center line X-X.

The center hinge pins 1014 include a first center hinge pin 1014A, fixed proximate to a back edge of the slot 1024 in the base unit 1020, a second center hinge pin 1014B, which may function as a drive pin and slides within the slot 1024, a third center hinge pin 1014C, a fourth center hinge pin 1014D, which slides within the slot 1034 of the gripper assembly 1030, and a fifth center hinge pin 1014E, which is fixed proximate to a front edge of the slot 1034. It will be appreciated that the drive pin may be located at other positions. It will also be appreciated that additional pins and cross-braces may be employed to increase the reach of the gripper mechanism 1000 still further.

Figure 10C:
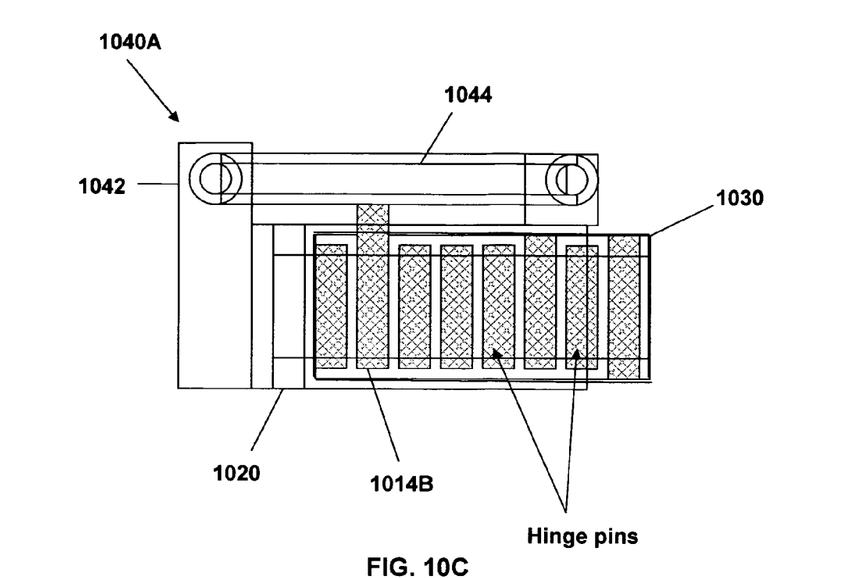
Figure 10D:
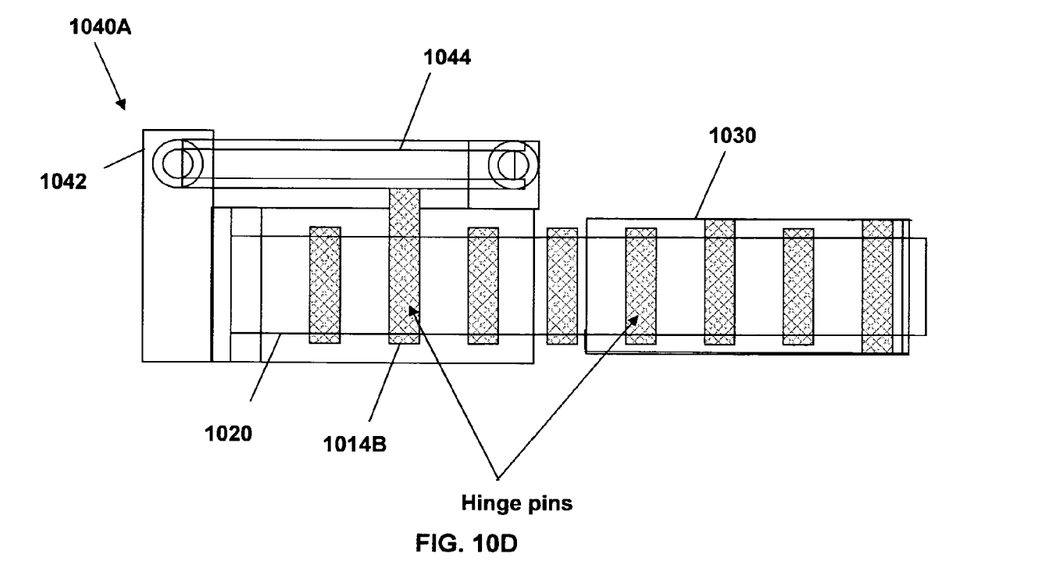
Figure 10E:
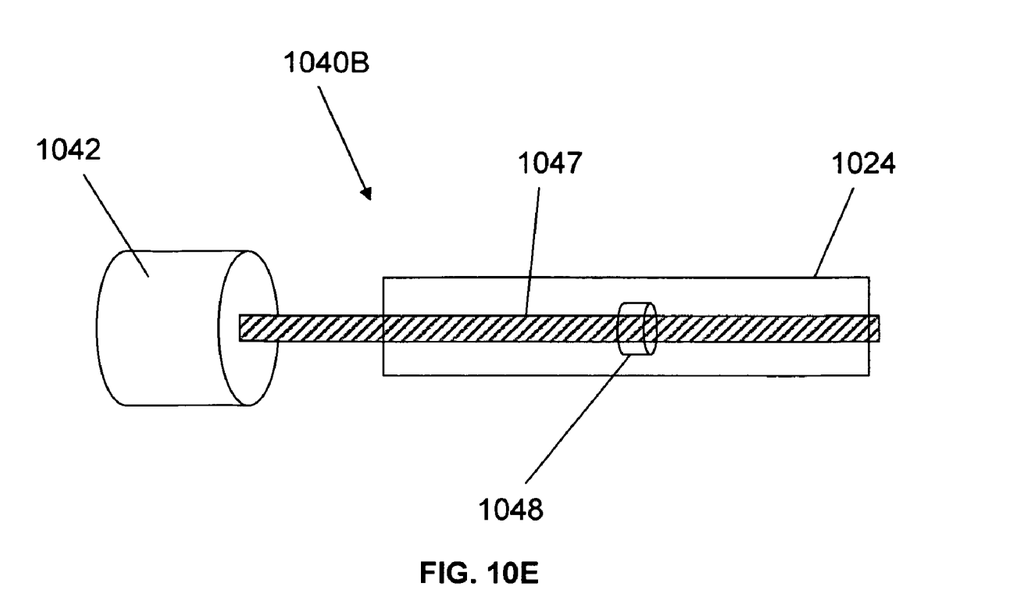

In the side views of FIGS. 10C and 10D, a drive mechanism 1040A includes a motor 1042 is coupled to the drive pin 1014B with a belt 1044. As the motor 1042 is activated in one direction or the other, the belt 1044 moves the drive pin 1014B within the slot 1024. As illustrated in FIG. 10E, a drive mechanism 1040B may instead include a motor 1042 and a lead screw 1047. The lead screw engages an internally threaded collar 1048 secured to, or part of, the drive pin 1014B. When the motor 1042 is activated in one direction or the other, the lead screw 1047 rotates within the threaded collar 1048, moving the drive pin 1014B within the slot 1024. It will be appreciated that other mechanisms may be used to drive the scissors mechanism 1010.

When the gripper mechanism 1000 is positioned in front of a cell and the drive mechanism 1040 activated in one direction, the scissors mechanism 1010, through the drive pin 1014B, expands and the gripper assembly 1030 extends outward from the base unit 1020. Depending on how long the drive mechanism 1040 remains activated, the gripper assembly 1030 is capable of extending into the cell and reaching a cartridge stored in any position therein. Once the gripper assembly 1030 has gripped the cartridge, the drive mechanism 1040 is activated in the reverse direction, the scissors mechanism 1010 retracts and the gripper assembly 1030 withdraws from the cell into the base unit 1020. A reverse process may be used by the gripper mechanism 1000 to insert a cartridge through the front opening of a cell and place it in the front position or push it into an inside cell position.

Figure 11A:
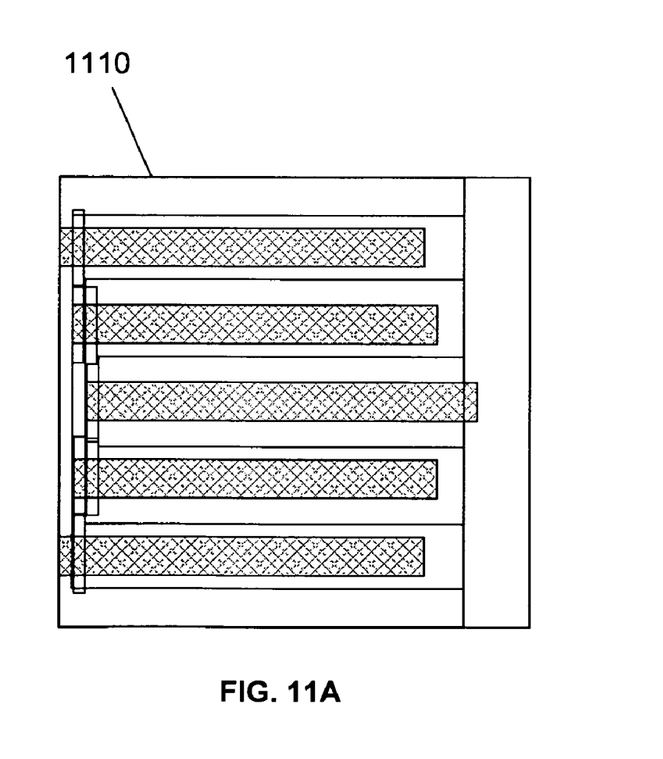
FIGS. 11A, 11B and 11C illustrate another embodiment of a deep-reach cartridge gripper of the present invention, in the retracted and extended states, respectively, along with a drive mechanism.
Figure 11B:
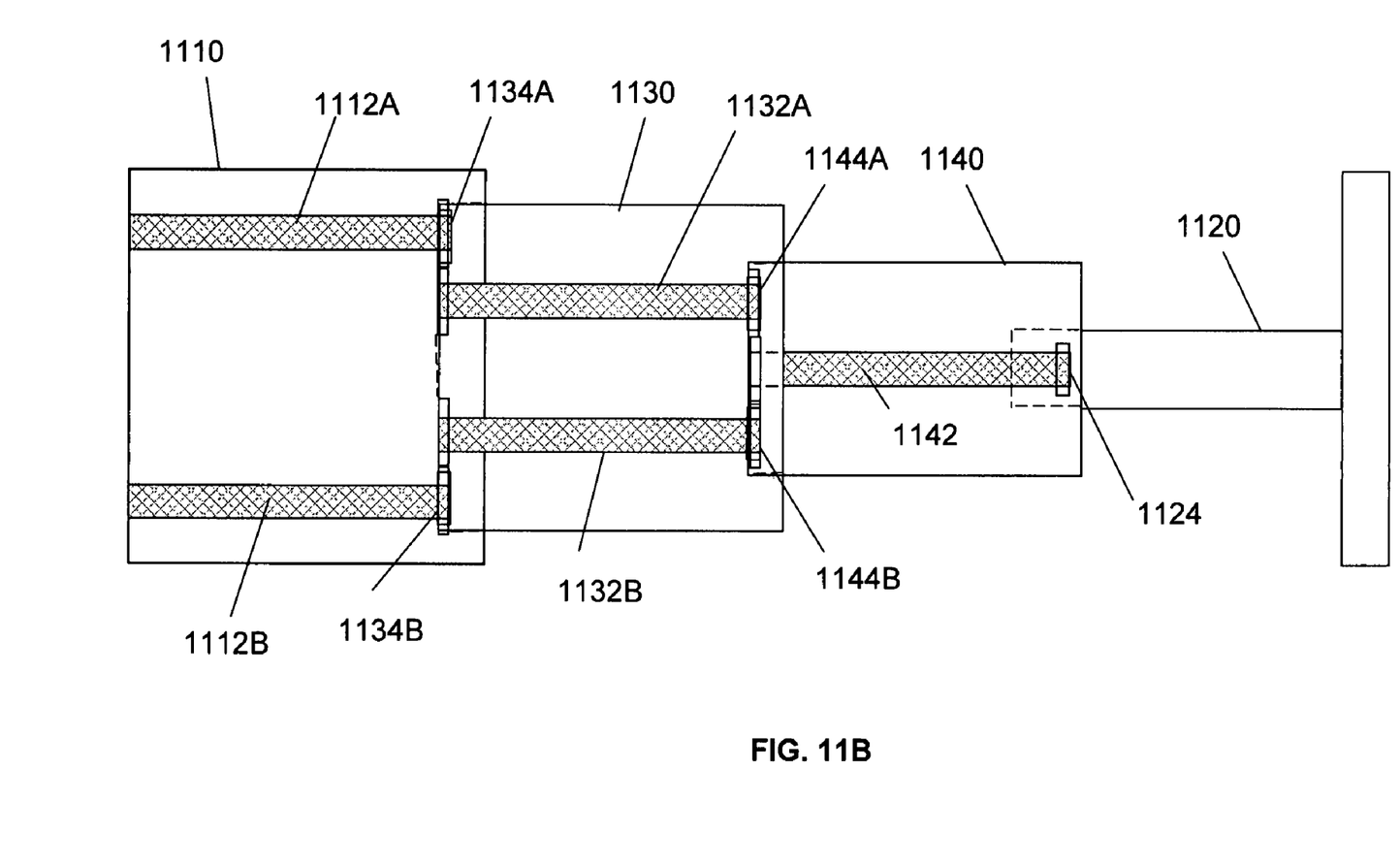
Figure 11C:
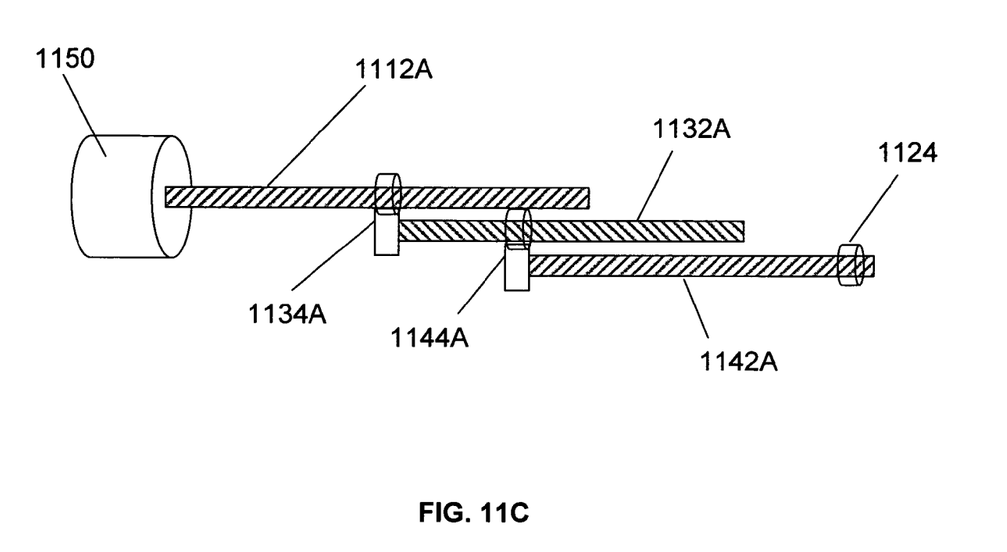

FIGS. 11A through 11C illustrate another embodiment of a deep-reach cartridge gripper mechanism 1100 of the present invention, in the retracted and extended states, respectively. The gripper mechanism 1100 includes a base unit 1110 which houses a gripper assembly 1120 functionally comparable to the gripper assembly 20 (FIG. 2) and one or more telescoping intermediate units 1130, 1140 (two are shown in FIGS. 11A-11C; however, a different number of intermediate units may be used). The base unit 1110 and the intermediate units 1130, 1140 each include one or more lead screws. For strength and stability, the base unit 1110 has two lead screws 1112A, 1112B and the first intermediate unit 1130 has two lead screws 1132A, 1132B. While the second intermediate unit 1140 may have two lead screws, a single one 1142 may be sufficient. Mating with the lead screws 1112A, 1112B on the base unit 1110 are internally threaded collars 1134A, 1134B secured to the next (first intermediate) unit 1130 so as to be able to rotate but move with unit 1130 and rotatably coupled (using gear teeth, belts or other means) to lead screws 1132A and 1132B respectively. Mating with the lead screws 1132A, 1132B on the first intermediate unit 1310 are internally threaded collars or thrust gears 1144A, 1144B secured to move with the next (second intermediate) unit 1130 and rotatably coupled to lead screw 1142. Mating with the lead screw 1142 on the second intermediate unit 1340 is a threaded collar 1144 secured to the next (gripper assembly) unit 1120.

As illustrated in FIG. 11C, a drive mechanism, such as a motor 1150, drives the lead screws 1112A, 1112B, 1132A, 1132B, 1142 through the series of internally threaded collars or thrust gears 1124A, 1134A and 1144A, (the other set of lead screws 1112B and 1132B are similarly driven but not shown in the FIG. 11C). It will be appreciated that other mechanisms may be used to drive the lead screws 1112A/B, 1132A/B and 1142.

When the gripper 1100 is positioned in front of a cell and the drive mechanism 1150 activated in a first direction, the lead screws 1112A, 1112B, 1132A, 1132B, 1142 rotate and the intermediate units 1130, 1140 and the gripper assembly 1120 extend outward from the base unit 1110 into the cell. Depending on how long the drive mechanism 1150 remains activated, the gripper assembly 1120 is capable of extending into the cell and reaching a cartridge stored in any position therein. Once the gripper assembly 1120 has gripped the cartridge, the drive mechanism 1150 is activated in the reverse direction, the intermediate units 1130, 1400 and the gripper assembly 1120 retract and withdraw from the cell into the base unit 1110. A reverse process may be used by the gripper mechanism 1100 to insert a cartridge through the front opening of a cell and place it in the front position or push it into an inside cell position.

Another mechanism for retrieving cartridges which are in multiple-cartridge cells is a gripper which is moved outward and inward through the use of one or more wires or metal tapes powered by a motor, in the same manner that a power antenna is raised and lowered on a car.

When the gripper of any embodiment is used to remove cartridges from a multi-cartridge cell, if the desired cartridge is not the front-most cartridge, cartridges in positions in front of the desired cartridge must be removed and stored in a temporary location before the gripper can reach the desired cartridge. One option is to employ as one gripper for each cartridge position in the cell. Each gripper would remove and hold one cartridge. While using multiple grippers would be fast, it would also be expensive. Alternatively, spare storage cells slots may be designated throughout the library. The gripper would remove a first cartridge, transport it and insert it into the closest spare cell, return and remove the desired cartridge. If the desired cartridge did not become the front cartridge, the gripper would remove the new front cartridge, transport it and insert it into the spare cell, then return and remove the desired cartridge (or repeat the process until the desired cartridge is reachable). The cartridges in the spare cells may either remain there, with appropriate updates to the library inventory, or may be moved back to the original or other cell. As original spare cells are filled, cartridges may be moved about to provide less random, more evenly spaced spare cells, perhaps while the accessor is otherwise idle. While this method has the advantage of being inexpensive, it is also slow.

Another alternative is to provide a "hook" or other comparable fixture on the front of slots and let the gripper hang front cartridges on the hook. Or, temporary storage may be provided on the gripper or accessor itself. Both of these methods would require the gripper to perform more complicated and precise movements.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for removing data cartridges from front openings of multi-cartridge storage cells.

What is claimed is:

1. An automated data storage library, comprising:
   a data drive for reading/writing data from/to media within data cartridges;
   a plurality of multi-cartridge storage cells arranged in a two-dimensional array, each cell having a front opening and a back, data cartridges being retained in positions in a cell from a front position to a rear position; and
   a deep-reach gripper for transporting cartridges within the library, comprising:
   means for inserting cartridges into the front openings of the cells; and
   means extendable into the cells for removing cartridges from any position in the cells, the means for removing having a retracted length and an extended length, the extended length being greater than the retracted length.

2. The automated data storage library of claim 1, wherein the means for removing comprises:
   a base unit having a first slot formed along a portion of a longitudinal center line of the removing means;
   a gripper assembly, comprising means for gripping cartridges having a second slot formed along a portion of the longitudinal center line;
   a scissors mechanism extendable along the longitudinal center line, comprising:
   a plurality of center hinge pins located along the longitudinal center line, including:
   a first center hinge pin fixed proximate to a back edge of the first slot in the base unit;

a second center hinge pin slidable within the first slot in the base unit from the back edge to a front edge;

a third center hinge pin;

a fourth center hinge pin slidable within the second slot in the gripper assembly from a back edge to a front edge; and a fifth center hinge pin fixed proximate to the front edge of the second slot in the gripper assembly;

a plurality of pairs of side hinge pins, one pin of each pair located at opposite ends of one of a plurality of lines crossing the longitudinal center line perpendicularly half-way between adjacent center pins;

a drive pin; and a plurality of cross-braces connected by the center hinge pins and the side hinge pins; and a drive mechanism coupled to the drive pin whereby, when the drive mechanism is activated in a first direction, the gripper is extended outward from the base unit and, when the drive mechanism is activated in a second direction, the gripper is retracted into the base unit.

3. The automated data storage library of claim 2, wherein the drive mechanism comprises:

a motor; and a drive belt coupled between the motor and the drive pin.

4. The automated data storage library of claim 2, wherein the drive mechanism comprises:

a motor; and a lead screw coupled between the motor and the drive pin.

5. The automated data storage library of claim 1, wherein the means for removing comprises:

a base unit comprising a first lead screw secured thereto;

a first intermediate unit slideable outwardly from a front of the base unit, comprising:

a first threaded collar mated to the first lead screw; and a second lead screw;

a gripper assembly slideable outwardly from a front of the first intermediate unit, comprising a second threaded collar mated to the second lead screw;

a drive mechanism coupled to rotate the first and second lead screws whereby:

when the drive mechanism is activated in a first direction, the first intermediate unit extends outward from the base unit and the gripper assembly extends outward from the first intermediate unit; and when the drive mechanism is activated in a second direction, the gripper assembly retracts into the first intermediate unit and the first intermediate unit retracts into the base unit.

6. The automated data storage library of claim 5, wherein the drive mechanism comprises:

a motor; and a drive belt coupled between the motor and the lead screws.

7. The automated data storage library of claim 5, further comprising a second intermediate unit slideable outwardly from a front of the first intermediate unit, the second intermediate unit comprising:

a third threaded collar mated to the second lead screw; and a third lead screw to which the second threaded collar is mated;

the drive mechanism further coupled to rotate the third lead screw whereby:

when the drive mechanism is activated in a first direction, the first intermediate unit extends outward from the base unit, the second intermediate unit extends outward from the first intermediate unit, and the gripper assembly extends outward from the second intermediate unit; and when the drive mechanism is activated in a second direction, the gripper assembly retracts into the second intermediate unit, the second intermediate unit retracts into the first intermediate unit and the first intermediate unit retracts into the base unit.

8. The automated data storage library of claim 1, further comprising means for adjusting the capacity of the storage cells.

9. The automated data storage library of claim 8, wherein the means for adjusting comprises a pin insertable through opposite walls of a storage cell at predetermined locations substantially corresponding to multiples of a length of a data cartridge.

10. A deep-reach gripper for transporting cartridges within an automated data storage library, comprising:

means for inserting cartridges into the front openings of multi-cartridge storage cells, data cartridges being retained in positions in a storage cell from a front position to a rear position; and means extendable in the storage cell for removing cartridges from any position in the storage cell, the means for removing having a retracted length and an extended length, the extended length being greater than the retracted length.

11. The deep-reach gripper of claim 10, wherein the means for removing comprises:

a base unit having a first slot formed along a portion of a longitudinal center line of the removing means;

a gripper, comprising means for gripping cartridges having a second slot formed along a portion of the longitudinal center line;

a scissors mechanism extendable along the longitudinal center line, comprising:

a plurality of center hinge pins located along the longitudinal center line, including:

a first center hinge pin fixed proximate to a back edge of the first slot in the base unit;

a second center hinge pin slidable within the first slot in the base unit from the back edge to a front edge;

a third center hinge pin;

a fourth center hinge pin slidable within the second slot in the gripper assembly from a back edge to a front edge; and a fifth center hinge pin fixed proximate to the front edge of the second slot in the gripper assembly;

a plurality of pairs of side hinge pins, one pin of each pair located at opposite ends of one of a plurality of lines crossing the longitudinal center line perpendicularly half-way between adjacent center pins;

a drive pin; and a plurality of cross-braces connected by the center hinge pins and the side hinge pins; and a drive mechanism coupled to the drive pin whereby, when the drive mechanism is activated in a first direction, the gripper assembly is extended outward from the base unit and, when the drive mechanism is activated in a second direction, the gripper assembly is retracted into the base unit.

12. The deep-reach gripper of claim 11, wherein the drive mechanism comprises:

a motor; and a drive belt coupled between the motor and the drive pin.

13. The deep-reach gripper of claim 11, wherein the drive mechanism comprises:

a motor; and a lead screw coupled between the motor and the drive pin.

14. The deep-reach gripper of claim 10, wherein the means for removing comprises:
- a base unit comprising a first lead screw secured thereto;
- a first intermediate unit slideable outwardly from a front of the base unit, comprising:
  - a first threaded collar mated to the first lead screw; and
  - a second lead screw;
- a gripper assembly slideable outwardly from a front of the first intermediate unit, comprising a second threaded collar mated to the second lead screw; and
- a drive mechanism coupled to rotate the first and second lead screws whereby:
  - when the drive mechanism is activated in a first direction, the first intermediate unit extends outward from the base unit and the gripper assembly extends outward from the first intermediate unit; and
  - when the drive mechanism is activated in a second direction, the gripper assembly retracts into the first intermediate unit and the first intermediate unit retracts into the base unit.

15. The deep-reach gripper of claim 14, wherein the drive mechanism comprises:
- a motor; and
- a drive belt coupled between the motor and the lead screws.

16. The deep-reach gripper of claim 14, further comprising a second intermediate unit slideable outwardly from a front of the first intermediate unit, the second intermediate unit comprising:
- a third threaded collar mated to the second lead screw; and
- a third lead screw to which the second threaded collar is mated;
- the drive mechanism further coupled to rotate the third lead screw whereby:
  - when the drive mechanism is activated in a first direction, the first intermediate unit extends outward from the base unit, the second intermediate unit extends outward from the first intermediate unit, and the gripper assembly extends outward from the second intermediate unit; and
  - when the drive mechanism is activated in a second direction, the gripper assembly retracts into the second intermediate unit, the second intermediate unit retracts into the first intermediate unit and the first intermediate unit retracts into the base unit.

17. A method for removing data cartridges from front openings of multi-cartridge storage cells in an automated data storage library, data cartridges being retained in positions in a cell from a front position to a rear position, the method comprising:
- means for positioning a deep-reach gripper proximate to the front opening of a first cell;
- extending the gripper through the front opening of the first cell to a depth corresponding to a front edge of a first cartridge stored in a first position in the first cell;
- gripping and removing the first cartridge;
- positioning the gripper proximate to the front opening of a second cell;
- placing the first cartridge in an empty position in the second cell;
- returning the gripper to a position proximate to the front opening of the first cell;
- extending the gripper through the front opening of the first cell to a depth corresponding to a front edge of a second cartridge stored in a second position in the first cell; and
- gripping and removing the second cartridge.

18. The method of claim 17, wherein extending the gripper comprises activating a scissors mechanism to extend the gripper into the first cell.

19. The method of claim 17, wherein extending the gripper comprises activating a set of lead screws to extend the gripper into the first cell.

* * * * *